(12) United States Patent
Son et al.

(10) Patent No.: US 8,119,720 B2
(45) Date of Patent: Feb. 21, 2012

(54) THERMOPLASTIC RESIN COMPOSITION HAVING IMPROVED FLOWABILITY

(75) Inventors: Se Bum Son, Uiwang-si (KR); Sung Hee Ahn, Uiwang-si (KR); Sung Duk Hwang, Uiwang-si (KR); In Hwan Oh, Uiwang-si (KR); Seong Ho Kong, Uiwang-si (KR); Hye Jin Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/647,620

(22) Filed: Dec. 28, 2009

(65) Prior Publication Data

US 2010/0168292 A1    Jul. 1, 2010

(30) Foreign Application Priority Data

Dec. 29, 2008 (KR) .................. 10-2008-0135499
Sep. 9, 2009   (KR) .................. 10-2009-0084918

(51) Int. Cl.
    *C08K 5/02* (2006.01)
(52) U.S. Cl. ........ 524/464; 524/114; 524/504; 524/341; 524/366; 252/609
(58) Field of Classification Search .................. 524/114
    See application file for complete search history.

(56) References Cited

U.S. PATENT DOCUMENTS

| | | | |
|---|---|---|---|
| 4,027,073 A | 5/1977 | Clark | |
| 4,994,515 A | 2/1991 | Washiyama et al. | |
| 5,039,729 A * | 8/1991 | Brackenridge et al. | 524/412 |
| 5,055,235 A | 10/1991 | Brackenridge et al. | |
| 5,290,855 A | 3/1994 | Kodama et al. | |
| 5,635,565 A | 6/1997 | Miyajima et al. | |
| 5,712,336 A | 1/1998 | Gareiss et al. | |
| 5,989,723 A | 11/1999 | Tsai et al. | |
| 6,117,371 A | 9/2000 | Mack | |
| 6,447,913 B1 | 9/2002 | Watanabe et al. | |
| 7,288,587 B2 | 10/2007 | Saitou et al. | |
| 2001/0041772 A1 | 11/2001 | Masubuchi et al. | |
| 2005/0137311 A1 | 6/2005 | Mulem et al. | |
| 2008/0088961 A1 | 4/2008 | Kushida | |
| 2008/0160240 A1 | 7/2008 | Son et al. | |
| 2008/0221255 A1* | 9/2008 | Ahn et al. | 524/502 |
| 2010/0029828 A1* | 2/2010 | Ahn et al. | 524/464 |
| 2010/0041800 A1 | 2/2010 | Son et al. | |
| 2010/0113648 A1 | 5/2010 | Niessner et al. | |
| 2010/0152342 A1 | 6/2010 | Kong et al. | |
| 2010/0152372 A1 | 6/2010 | Oh et al. | |
| 2010/0168315 A1 | 7/2010 | Park et al. | |
| 2010/0249314 A1 | 9/2010 | Park et al. | |

FOREIGN PATENT DOCUMENTS

| | | |
|---|---|---|
| EP | 0489912 A1 | 6/1992 |
| EP | 0502333 A1 | 9/1992 |
| JP | 01-163243 A | 6/1989 |
| JP | 01-263149 A | 10/1989 |
| JP | 01-304153 A | 12/1989 |
| JP | 05-295196 A | 11/1993 |
| JP | 05-339479 A | 12/1993 |
| JP | 06-322200 A | 11/1994 |
| JP | 08-311300 A | 11/1996 |
| JP | 10-175893 | 6/1998 |
| JP | 2001-139742 | 5/2001 |
| JP | 14-97374 A | 4/2002 |
| JP | 2005-272640 | 10/2005 |
| JP | 18-111787 A | 4/2006 |
| JP | 2006-143955 | 6/2006 |
| JP | 2007-314619 | 12/2007 |
| KR | 10-1991-0000910 A | 1/1991 |
| KR | 910008803 B1 | 10/1991 |
| KR | 10-1994-0026146 A | 12/1994 |
| KR | 159256 B1 | 1/1999 |
| KR | 10-2004-0022374 A | 3/2004 |
| KR | 2004-0079118 A | 9/2004 |
| WO | 90/15103 A | 12/1990 |
| WO | 92/00351 A1 | 1/1992 |
| WO | 2008/082138 A1 | 7/2008 |
| WO | 2009/084808 A1 | 7/2009 |

OTHER PUBLICATIONS

Office Action in commonly owned U.S. Appl. No. 12/628,258, mailed on Mar. 24, 2011, pp. 1-22.
Office Action in commonly owned U.S. Appl. No. 12/538,266, mailed on Oct. 27, 2010, pp. 1-7.
Korean Office Action in commonly owned Korean Application No. 2008-128424 dated Oct. 29, 2010, pp. 1-3.
International Search Report in commonly owned International Application No. PCT/KR2008/006528, dated Jun. 1, 2009, pp. 1-4.
Notice of Allowance in commonly owned U.S. Appl. No. 12/512,134 mailed on Mar. 8, 2011, pp. 1-5.
BASF, Joncryl ADR-4370-S, Mar. 13, 2007, pp. 1-9.

(Continued)

*Primary Examiner* — Doris Lee
(74) *Attorney, Agent, or Firm* — Summa, Additon & Ashe, P.A.

(57) ABSTRACT

A thermoplastic resin composition that can have improved flowability of the present invention comprises (A) about 1 to about 98% by weight of a functional group-containing vinyl copolymer resin reactive with polyester; (B) about 1 to about 98% by weight of an aromatic vinyl graft copolymer resin; (C) about 1 to about 98% by weight of a polyester resin; and (D) about 0.5 to about 30 parts by weight of a bromodiphenyl ethane mixture, based on the total weight of a base resin comprising (A), (B) and (C). The resin composition of the present invention can have flame retardancy, excellent impact resistance, and improved flowablity.

14 Claims, No Drawings

OTHER PUBLICATIONS

Villalobos et al., "Oligonneric chain extenders for economic reprocessing and recycling of condensation plastics," ScineceDirect, Energy 31, 2006, pp. 3227-3234.
Korean Office Action in commonly owned Korean Application No. 2008-128424 dated May 27, 2011, pp. 1-4.
Office Action in commonly owned U.S. Appl. No. 12/647,601 dated Apr. 21, 2011, pp. 1-11.
Office Action in commonly owned U.S. Appl. No. 12/797,645 dated Apr. 22, 2011, pp. 1-7.
International Search Report in commonly owned International Application No. PCT/KR2007/006833 dated Mar. 25, 2008, pp. 1-2.
Machine Translation of JP 2005-272640A, downloaded from http://www19.ipdl.inpit.go.jp/PA1/cgi-bin/PA1DETAIL, Jun. 23, 2009, pp. 1-13.
Office Action in commonly owned U.S. Appl. No. 11/965,013, mailed on Jul. 1, 2009, pp. 1-18.
Notice of Allowance in commonly owned U.S. Appl. No. 12/037,123, mailed on Feb. 2, 2011, pp. 1-12.
Advisory Action in commonly owned U.S. Appl. No. 11/965,013, mailed on May 7, 2010, pp. 1-9.
International Preliminary Report on Patentability in commonly owned International Application No. PCT/KR2007/006833 dated Jun. 30, 2009, pp. 1-4.
Office Action in commonly owned U.S. Appl. No. 12/037,123, mailed on Jan. 25, 2010, pp. 1-11.
Office Action in commonly owned U.S. Appl. No. 12/037,123, mailed on Jun. 29, 2010, pp. 1-10.
U.S. Patent Office Advisory Action in commonly owned U.S. Appl. No. 12/037,123 dated Oct. 18, 2010, pp. 1-3.
Chinese Office Action in commonly owned Chinese Application No. 200910166160 dated Nov. 29, 2010, pp. 1-5.
English translation of Chinese Office Action in commonly owned Chinese Application No. 200910166160 dated Nov. 29, 2010, pp. 1-6.
Office Action in commonly owned U.S. Appl. No. 11/965,013, mailed on Jan. 28, 2010, pp. 1-17.
Office Action in commonly owned U.S. Appl. No. 12/538,266, mailed on Aug. 10, 2009, pp. 1-7.
Notice of Allowance in commonly owned U.S. Appl. No. 12/037,123 mailed on Feb. 1, 2011, pp. 1-8.
Notice of Allowance in commonly owned U.S. Appl. No. 12/538,266 mailed on Feb. 17, 2011, pp. 1-8.
Office Action in commonly owned U.S. Appl. No. 12/512,134, mailed on Apr. 21, 2010, pp. 1-6.
Office Action in commonly owned U.S. Appl. No. 12/512,134, mailed on Aug. 27, 2010, pp. 1-5.

* cited by examiner

THERMOPLASTIC RESIN COMPOSITION HAVING IMPROVED FLOWABILITY

CROSS-REFERENCE TO RELATED APPLICATIONS

This application claims priority from Korean Patent Application No. 2008-0135499, filed Dec. 29, 2008, and Korean Patent Application No. 2009-0084918, filed Sep. 9, 2009 in the Korean Intellectual Property Office, the disclosure of each of which is incorporated herein by reference in its entirety.

FIELD OF THE INVENTION

The present invention relates to a thermoplastic resin composition having improved flowability.

BACKGROUND OF THE INVENTION

ABS/polyester blends can have good processability and excellent physical properties, such as high impact strength. Accordingly, ABS/polyester blends have been widely used in a variety of applications, including the production of internal or external parts of electric/electronic goods and office equipment. However, ABS/polyester blends can burn when used in heat-emitting devices, since ABS/polyester blends are combustable. Further, these blends can operate as an energy source to help combustion if ignited by a flame from an external heat source.

Increasingly electrical and electronic products require flame retardancy for safety reasons. Thus, methods for imparting flame retardancy to ABS/polyester blends are being developed.

However, if a large amount of flame retardant is added to a ABS/polyester blend to impart flame retardency, mold processability of the ABS/polyester blend may decrease.

Currently, electric/electronic products and office equipment are becoming larger overall, yet thinner. When ABS/polyester blends are employed in such a large, yet thin, product, it can be necessary to add a large amount of flame retardant to obtain sufficient flame retardancy. As a result, mold processability of ABS/polyester blends may decrease. Therefore, there is a need to improve flowability of ABS/polyester blends, which can directly effect mold processability of the final products.

In order to reduce the risk of a fire, halogenated flame retardants may be added to some thermoplastic resins. Halogenated flame retardants generally used include TBBPA (2,2', 6,6'-tetrabromo-4,4'-isopropylidenediphenol), tris(tribromophenoxy) triazine, decabromodiphenyl ethane (DBDPE), and the like. However, TBBPA causes an environmental problem and is easily degraded when TBBPA is processed at high temperatures due to its low thermal decomposition temperature. Moreover, TBBPA has poor compatibility with ABS/polyester blends due to a hydroxyl (—OH) group structurally present in TBBPA.

In order to address the drawbacks of the TBBPA, tris(tribromophenoxy) triazine can be used as a flame retardant. Tris(tribromophenoxy) triazine, however, is also not desirable from an environmental aspect since the tris(tribromophenoxy) triazine is produced using tribromophenol.

DBDPE has the most favorable environmental properties among the halogenated flame retardants. However, DBDPE is difficult to use in ABS/polyester blends since DBDPE has a very high melting point and poor compatibility. Additionally, DBDPE is very limited in use since the addition of DBDPE to a resin can greatly reduce impact resistant strength and decrease flowability.

SUMMARY OF THE INVENTION

The present inventors have developed diphenyl ethane mixtures which can be useful as flame retardants. The diphenyl ethane mixtures of the invention are partially brominated and have specific compositions. The bromodiphenyl ethane mixtures can provide excellent flame resistance, thermal stability, and compatibility with a variety of thermoplastic resins. In addition, the bromodiphenyl ethane mixtures of the invention can minimize generation of environmental problems and improve impact strength, flowability and thermal stability of resins.

The present invention also provides resin compositions including the bromodiphenyl ethane mixtures. The bromodiphenyl ethane mixtures of the invention can substantially minimize degradation of inherent physical properties of the resin. Accordingly, the resin compositions of the invention can exhibit excellent impact resistance, coloration resistance, and flowability as well as flame resistance.

The present invention further provides a molded article produced from the aforementioned resin composition.

The present invention also provides a method of simultaneously improving impact resistance, flowability and flame resistance of a thermoplastic resin by using the bromodiphenyl ethane mixture as a flame retardant.

According to a further aspect of the present invention, there is provided a thermoplastic resin composition having improved flowability.

In an exemplary embodiment of the present invention, the thermoplastic resin composition with improved flowability comprises: (A) about 1 to about 98% by weight of a functional group-containing vinyl copolymer resin reactive with polyester; (B) about 1 to about 98% by weight of an aromatic vinyl graft copolymer resin; (C) about 1 to about 98% by weight of a polyester resin; and (D) about 0.5 to about 30 parts by weight of a bromodiphenyl ethane mixture, based on about 100 parts by weight of a base resin comprising (A), (B) and (C).

In another exemplary embodiment of the present invention, the thermoplastic resin composition with improved flowability comprises: (A) about 1 to about 98% by weight of a functional group-containing vinyl copolymer resin reactive with polyester; (B) about 1 to about 98% by weight of an aromatic vinyl graft copolymer resin; (C) about 1 to about 98% by weight of a polyester resin; (D) about 0.5 to about 30 parts by weight of a bromodiphenyl ethane mixture, based on about 100 parts by weight of a base resin comprising (A), (B) and (C); and about 0.5 to about 30 parts by weight of a bromine-containing flame retardant (E), based on about 100 parts by weight of a base resin comprising (A), (B) and (C).

In another exemplary embodiment of the present invention, the thermoplastic resin composition with improved flowability comprises: (A) about 10 to about 80% by weight of a functional group-containing vinyl copolymer resin reactive with polyester; (B) about 10 to about 80% by weight of an aromatic vinyl graft copolymer resin; (C) about 10 to about 80% by weight of a polyester resin; (D) about 5 to about 13 parts by weight of a bromodiphenyl ethane mixture, based on about 100 parts by weight of a base resin comprising (A), (B) and (C); and about 1 to about 7 parts by weight of a bromine-containing flame retardant (E), based on about 100 parts by weight of a base resin comprising (A), (B) and (C).

In another exemplary embodiment of the present invention, the thermoplastic resin composition with improved flowability comprises: (A) about 10 to about 80% by weight of a functional group-containing vinyl copolymer resin reactive with polyester; (B) about 10 to about 80% by weight of an aromatic vinyl graft copolymer resin; (C) about 10 to about 80% by weight of a polyester resin; (D) about 5 to about 13 parts by weight of a bromodiphenyl ethane mixture, based on about 100 parts by weight of a base resin comprising (A), (B) and (C); and about 10 to about 20 parts by weight of a bromine-containing flame retardant (E), based on about 100 parts by weight of a base resin comprising (A), (B) and (C).

In another exemplary embodiment of the present invention, the total amount of bromodiphenyl ethane mixture (D) and the bromine-containing flame retardant (E) may be used in amount range of about 10 to about 30 parts by weight, based on about 100 parts by weight of the base resin comprising (A), (B), and (C).

In another embodiment of the present invention, the ratio of bromodiphenyl ethane mixture (D) to the bromine-containing flame retardant (E) can be about 35 to about 70% by weight to about 30 to about 65% by weight.

In another embodiment of the present invention, the bromodiphenyl ethane mixture (D) comprises about 5 to about 85% by weight of hexabromodiphenyl ethane and about 0.01 to about 30% by weight of heptabromodiphenyl ethane, based on the total weight of the bromodiphenyl ethane mixture. In another embodiment of the present invention, the bromodiphenyl ethane mixture (D) comprises about 55 to about 85% by weight of hexabromodiphenyl ethane and about 1 to about 25% by weight of a brominated diphenyl ethane compound in which the number of bromine substituents is odd, based on the total weight of the bromodiphenyl ethane mixture.

In another embodiment of the present invention, the bromine-containing flame retardant (E) includes bromine in an amount of about 40 to about 87% by weight. In another embodiment of the present invention, the bromine-containing flame retardant (E) comprises tetrabromobisphenol A, decabromodiphenyloxide, decabromodiphenyl ethane, 1,2-bis(tribromophenyl)ethane, brominated epoxy oligomer having a molecular weight of about 600 to about 8,000, octabromotrimethylphenyl indane, bis(2,3-dibromopropyl ether), tris(tribromophenyl)triazine, brominated aliphatic or aromatic hydrocarbon or a combination thereof.

In another exemplary embodiment of the present invention, the thermoplastic resin composition further comprises one or more additives selected from the group consisting of heat stabilizers, dyes, pigments, lubricants, releasing agents, dispersant, anti-dripping agents, weather stabilizers, inorganic fillers, inorganic fibers and the like and combinations thereof.

According to a further aspect of the present invention, there is provided a molded article produced from the aforementioned resin composition. In an exemplary embodiment of the present invention, the molded article may include pellets produced by extruding the resin composition. In another exemplary embodiment of the present invention, the molded article may include exterior materials for electric and electronic products.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Functional Group-Containing Vinyl Copolymer Resin Reactive with Polyester

The functional group-containing vinyl copolymer resin reactive with polyester of the present invention can be prepared by polymerizing an unsaturated compound containing a functional group reactive with polyester (a1) and a monomer mixture comprising a vinyl compound (a2), to provide the functional group-containing vinyl copolymer resin reactive with polyester.

The unsaturated compound containing a functional group reactive with polyester of the present invention (a1) may include an unsaturated epoxy compound containing an epoxy group.

The functional group-containing vinyl copolymer resin reactive with polyester of the present invention may comprise about 0.01 to about 5 mol % of the unsaturated compound containing a functional group reactive with polyester (a1), and about 95 to about 99.99 mol % of the vinyl compound (a2).

In the present invention, the functional group-containing vinyl copolymer resin reactive with polyester (A) is used in amount of about 1 to about 98% by weight, for example about 5 to about 80% by weight, as another example about 10 to about 50% by weight, and as another example about 15 to about 40% by weight, based on the total weight of the base resin comprising (A), (B), and (C). If the functional group-containing vinyl copolymer resin reactive with polyester is used in an amount in the above range, it is possible to obtain a balance of physical properties such as impact strength and flowability.

(a1) Unsaturated Compound Containing Functional Group(s) Reactive with Polyester.

Exemplary unsaturated compounds containing functional group(s) reactive with polyester used in the invention can be represented by the following chemical formula 1.

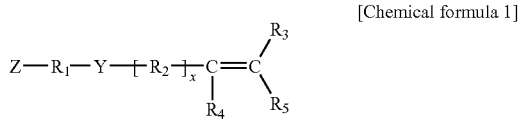

[Chemical formula 1]

wherein:

$R_3$, $R_4$, and $R_5$ are each independently hydrogen, saturated or unsaturated $C_1$-$C_{12}$ alkyl, $C_6$-$C_{14}$ aryl, or saturated or unsaturated $C_1$-$C_{12}$ alkyl-substituted $C_6$-$C_{14}$ aryl; and Y is an ether group (—O—), carboxyl group (—O—[C=O]—, —[O=C]-O—), $C_1$-$C_{12}$ alkylene, $C_6$-$C_{14}$ arylene, or $C_6$-$C_{14}$ aryl alkyl-substituted $C_6$-$C_{14}$ arylene;

with the proviso that when Y is an ether group (—O—) or carboxyl group (—O—[C=O]—, —[O=C]—O—), $R_1$ and $R_2$ are each independently $C_1$-$C_{12}$ alkylene, $C_6$-$C_{14}$ arylene or saturated or unsaturated $C_1$-$C_{12}$ alkyl-substituted $C_6$-$C_{14}$ arylene; and when Y is $C_1$-$C_{12}$ alkylene, $C_6$-$C_{14}$ arylene or saturated or unsaturated $C_1$-$C_{12}$ alkyl-substituted $C_6$-$C_{14}$ arylene, Y represents a (R1-Y—R2) structure, x=0 or 1, and Z is an epoxy group, carboxyl group, isocyanate group, oxadiazole group, amine group, or hydroxyl group.

Examples of the above unsaturated compound containing functional group(s) may include, but are not limited to, epoxy alkyl acrylate, allyl glycidyl ester, aryl glycidyl ester, glycidyl methacrylate, glycidyl acrylate, butadiene monoxide, vinyl glycidyl ether, glycidyl itaconate, and the like. These unsaturated compounds can be used alone or in combination with one another.

In exemplary embodiments of the invention, the unsaturated compound is added as a comonomer in an amount of about 0.01 to about 5 mol %, for example about 0.1 to about 5 mol %, and as another example about 0.3 to about 3 mol %. If the amount of the unsaturated compound is less than about 0.01 mol %, it can be difficult to improve impact strength. When the amount of the unsaturated compound exceeds about 5 mol %, there can be a problem of gelation during an extrusion process.

(a2) Vinyl Compound

The vinyl compound of the present invention may comprise aromatic vinyl monomers and a monomer copolymerizable with the aromatic vinyl monomer.

Examples of the aromatic vinyl monomers may include, but are not limited to, styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene and the like. These aromatic vinyl monomers can be used alone or in combination with one another.

The monomer copolymerizable with the aromatic vinyl monomer may be used alone or in combination with one or more other copolymerizable monomers. Examples of the monomer copolymerizable with the aromatic vinyl monomer may include, but are not limited to, unsaturated nitrile monomers such as acrylonitrile, methacrylonitrile, ethacrylonitrile, and the like, and combinations thereof.

The ratio of the aromatic vinyl monomers to the monomer copolymerizable with the aromatic vinyl monomer can be determined by the ratio of monomers of the aromatic vinyl graft copolymer resin (B) excluding rubber and compatibility. The vinyl compound can include about 50 to about 99% by weight of an aromatic vinyl monomer and about 1 to about 50% by weight of a copolymerizable monomer with the aromatic vinyl monomer. As another example, the vinyl compound can include about 60 to about 90% by weight of aromatic vinyl monomer and about 10 to about 40% by weight of copolymerizable monomer with the aromatic vinyl monomer. If the vinyl monomer is used in an amount in the above range, it is possible to obtain good processability and high intensity.

In order to improve the properties of the copolymer, the vinyl compound (a2) of the present invention may optionally include an ethylenic unsaturated monomer such as but not limited to $C_1$-$C_4$ alkyl (meth)acrylates such as methyl methacrylate; aromatic (meth)acrylates such as phenyl acrylate, phenyl methacrylate, benzyl acrylate, benzyl methacrylate, 2-phenyl ethyl acrylate, 2-phenyl ethyl methacrylate, 2-phenoxyethyl acrylate, and 2-phenoxy ethyl methacrylate; N-substituted maleimides such as N-methyl maleimide, N-phenyl maleimide and N-cyclohexyl maleimide; dicarboxylic acids such as maleic acid, fumaric acid, itaconic acid and anhydrides thereof; acrylic acid; methacrylic acid; nitrogen functional monomers such as dimethylaminoethyl acrylate, diethylaminoethyl acrylate, vinylimidazole, vinylpyrrolidone, vinylcaprolactam, vinylcarbazole, vinylaniline, acrylamide, methacrylamide, and the like, and combinations thereof. These monomers may be used in an amount of about 0 to about 30% by weight, for example about 1 to about 20% by weight, and as another example about 2 to about 15% by weight, based on the total weight of the vinyl compound (a2).

(B) Aromatic Vinyl Graft Copolymer Resin

The aromatic vinyl graft copolymer resin according to the present invention can be a polymer in which rubber phase polymers are dispersed in the form of particles in a matrix (continuous phase) comprising an aromatic vinyl polymer. In exemplary embodiments of the invention, the aromatic vinyl graft copolymer resin may be prepared by polymerizing the aromatic vinyl group-containing monomers with rubber. In exemplary embodiments, other monomers copolymerizable with the aromatic vinyl monomers may also be employed along with the aromatic vinyl monomers. The aromatic vinyl graft copolymer resin may be prepared by methods such as emulsion polymerization, suspension polymerization, bulk polymerization, and by extrusion of a graft copolymer resin and a copolymer resin. In bulk polymerization, both a graft copolymer resin and a copolymer resin are prepared together in one process. In other polymerizations, the graft copolymer resin and the copolymer resin may be prepared separately. Regardless of the polymerization technique used, the rubber content in a final aromatic vinyl graft copolymer resin (B) can be about 5 to about 65% by weight.

In exemplary embodiments of the invention, the aromatic vinyl graft copolymer resins can include copolymer resins of acrylonitrile-butadiene-styrene (ABS), copolymer resins of acrylonitrile-ethylenepropylene rubber-styrene (AES), copolymer resins of acrylonitrile-acrylic rubber-styrene (AAS), and the like, and combinations thereof.

In exemplary embodiments of the invention, the Z-average size of rubber particles of the aromatic vinyl graft copolymer resin can range from about 0.1 to about 6.0 μm, for example from about 0.25 to about 3.5 μm, to obtain desirable properties during blending of the aromatic vinyl graft copolymer resin and polyester resin.

In the present invention, the aromatic vinyl graft copolymer resin (B) can be used in an amount of about 1 to about 98% by weight, for example about 10 to about 80% by weight, as another example about 15 to about 60% by weight, and as another example about 20 to about 50% by weight, based on the total weight of the base resin composition comprising (A), (B), and (C). If the aromatic vinyl graft copolymer resin is used in an amount in the above range, it can be possible to obtain excellent physical properties of impact strength, chemical resistance and hydrolysis resistance.

In the aromatic vinyl graft copolymer resin of the present invention, the graft copolymer resin can be used alone or in combination with the copolymer resin, depending on the compatibility thereof.

In exemplary embodiments, the aromatic vinyl graft copolymer resin (B) of the present invention may include a mixture of about 10 to about 100% by weight of a graft copolymer resin (b1) and about 0 to about 90% by weight of a copolymer resin (b2), for example about 20 to about 90% by weight of a graft copolymer resin (b1) and about 10 to about 80% by weight of a copolymer resin (b2).

(b1) Graft Copolymer Resin

The graft copolymer resin (b1) may be prepared by graft-polymerizing rubbery polymer, aromatic vinyl monomer, unsaturated nitrile monomer, and optionally other monomer(s) imparting processability and heat resistance.

Examples of the rubbery polymers may include without limitation diene rubbers such as polybutadiene, poly(styrene-butadiene), poly(acrylonitrile-butadiene), and the like; saturated rubbers in which hydrogen is added to a diene rubber; isoprene rubbers; acryl rubbers such as polybutyl acrylic acid; and terpolymers of ethylene-propylene-diene (EPDM), and the like, and combinations thereof. The content of rubbery polymer in the graft copolymer resin may be about 5 to about 65% by weight, for example about 10 to about 65% by weight, based on the total weight of the graft copolymer resin (b1). The average size of the rubber particles can range from about 0.1 to about 4 μm taking into account the desired impact strength and appearance of the resin composition.

Examples of the aromatic vinyl monomer may include, but are not limited to, styrene, α-methyl styrene, β-methyl styrene, p-methyl styrene, p-t-butylstyrene, ethylstyrene, vinyl xylene, monochlorostyrene, dichlorostyrene, dibromostyrene, vinyl naphthalene and the like, and combinations thereof. The aromatic vinyl monomer may be used in an amount of about 34 to about 94% by weight based on the total weight of the graft copolymer resin (b1), and as another example about 40 to about 90% by weight.

Examples of the unsaturated nitrile monomer may include, but are not limited to, acrylonitrile, ethacrylonitrile, methacrylonitrile, and the like, and may be used alone or in combination of two or more. The amount of the unsaturated nitrile monomer can be about 1 to about 30% by weight, based on the total weight of the graft copolymer resin (b1), and as another example about 5 to about 25% by weight.

Examples of the monomer imparting processability and heat resistance may include without limitation acrylic acid, methacrylic acid, maleic anhydride, N-substituted maleimide, and the like, and combinations thereof. The monomer imparting processability and heat resistance may be used in an amount of about 0 to about 15% by weight, based on the total weight of the graft copolymer resin (b1), and as another example about 1 to about 12% by weight.

(b2) Copolymer Resin

The copolymer resin (b2) of the present invention may be prepared by copolymerizing aromatic vinyl monomer, unsaturated nitrile monomer and optionally other monomer(s) imparting processability and heat resistance.

Examples of the aromatic vinyl monomer may include, but are not limited to, styrene, α-methyl styrene, β-methyl styrene, p-methyl styrene, p-t-butyl styrene, ethylstyrene, vinyl xylene, monochlorostyrene, dichlorostyrene, dibromostyrene, vinyl naphthalene, and the like, and combinations thereof. The aromatic vinyl monomer can be used in an amount of about 70 to about 95% by weight, based on the total weight of the copolymer resin (b2), and as another example about 75 to about 90% by weight.

Examples of the unsaturated nitrile monomer may include, but are not limited to, unsaturated nitrile compounds such as acrylonitrile, ethacrylonitrile, methacrylonitrile, and the like, and may be used alone or in combination of two or more. The amount of the copolymerizable monomer with the aromatic vinyl monomer can be about 5 to about 30% by weight, based on the total weight of the copolymer resin (b2), and as another example about 10 to about 27% by weight.

Examples of the monomers imparting processability and heat resistance may include without limitation acrylic acid, methacrylic acid, maleic anhydride, N-substituted maleimide and the like, and combinations thereof. The amount of the monomers imparting processability and heat resistance can be about 0 to about 30% by weight, based on the total weight of the copolymer resin (b2), and as another example about 1 to about 25% by weight.

(C) Polyester Resin

The polyester used in the present invention can be a polyester resin or a copolymer thereof having an intrinsic viscosity of about 0.3 to about 1.15 g/dL, and as another example about 0.3 to about 1.0 g/dL.

In exemplary embodiments of the invention, the polyester resin may be prepared by condensation polymerization reaction of acid or ester such as terephthalic acid (TPA), isophthalic acid (IPA), 1,2-naphthalene dicarboxylic acid, 1,4-naphthalenedicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalenedicarboxylic acid, aromatic dicarboxylate in which acid is substituted with a dimethyl group such as dimethyl terephthalate (DMT) and dimethyl isophthalate, alkyl ester of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and combinations thereof; and diols having 2 to 12 carbon atoms such as ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like, and combinations thereof. The condensation polymerization reaction can be readily carried out by a person of ordinary skill in the art.

In an exemplary embodiment, the polyester resin may include polyethylene terephthalate, polybutylene terephthalate, or a combination thereof.

In exemplary embodiments of the invention, the polyester resin may be a polyester resin in which inorganic particles are mixed therein. Examples of suitable inorganic particles useful in the invention can include without limitation titanium dioxide ($TiO_2$), silicone dioxide ($SiO_2$), aluminum hydroxide ($Al(OH)_3$) and the like, and combinations thereof. The inorganic particles can be used in an amount of about 0 to about 30% by weight in the polyester resin.

In the present invention, the polyester resin is part of a base resin including the polyester resin, the functional group-containing vinyl copolymer resin reactive with polyester (A) (for example an epoxy group containing styrenic polymer) and the aromatic vinyl graft copolymer resin (B) and is used in the thermoplastic resin composition in an amount of about 1 to about 98% by weight, for example about 10 to about 90% by weight, as another example about 20 to about 80% by weight, and as another example about 30 to about 70% by weight, based on the total weight of the base resin comprising (A), (B), and (C). If the amount of the polyester is used within the above range, the resin composition obtained therefrom may have high impact strength and flowability.

(D) Bromodiphenyl Ethane Mixture

One aspect of the present invention relates to a novel bromodiphenyl ethane mixture. The bromodiphenyl ethane mixture is prepared by addition reaction of bromine with diphenyl ethane.

The bromodiphenyl ethane mixture (D) comprises about 5 to about 85% by weight of hexabromodiphenyl ethane and about 0.01 to about 30% by weight of heptabromodiphenyl ethane, based on the total weight of the bromodiphenyl ethane mixture.

In an exemplary embodiment, the bromodiphenyl ethane mixture may be prepared by injecting bromine into a reactor filled with diphenyl ethane, a solvent and a catalyst and reacting bromine with diphenyl ethane for about 0.5 to about 24 hours while the reactor is maintained at a temperature of about −20 to about 35° C. The catalyst can be a metal, a bromide or a chloride of aluminum or antimony, or a combination thereof. Exemplary catalysts include without limitation Al, $AlCl_3$, Sb, $SbCl_3$, $SbCl_5$, $SbBr_3$, $SbClBr_4$, $SbBrCl_4$, Fe, $FeCl_3$, $FeBr_3$, Ti, $TiCl_4$, $TiBr_4$, Sn, $SnCl_2$, $SnBr_3$, $SnCl_4$, $AlBr_3$, Be, $BeCl_2$, Cd, $CdCl_2$, Zn, $ZnCl_2$, B, $BF_4$, $BCl_3$, $BBr_3$, $BiCl_3$, Zr, $ZrCl_4$, and the like, and combinations thereof. The catalyst may be used in an amount of about 0.01 to about 3 moles per 1 mole of diphenyl ethane.

The bromine may be injected into the diphenyl ethane in a ratio range of about 5 to about 9 moles, for example about 6.0 to about 8.0 moles, and as another example about 6.2 to about 7.0 moles, per mole of diphenyl ethane, to thereby substitute about 5.5 to about 8.5 hydrogens within the diphenyl ethane.

In an exemplary embodiment, the bromodiphenyl ethane mixture may be a mixture of hexabromodiphenyl ethane, heptabromodiphenyl ethane, and octabromodiphenyl ethane. In another embodiment, the bromodiphenyl ethane mixture may further include pentabromodiphenyl ethane, nonabromodiphenyl ethane, decabromodiphenyl ethane, low molecular weight hydrocarbons, or a combination thereof. The low molecular weight hydrocarbons may include monobromodiphenyl ethane, dibromodiphenyl ethane, tribromodiphenyl ethane, tetrabromodiphenyl ethane, and the like, and combinations thereof.

In an exemplary embodiment based on an area ratio in a GC/MS (Gas Chromatography/Mass Spectrometry) analysis, the bromodiphenyl ethane mixture may comprise about 0.01 to about 20% by weight of heptabromodiphenyl ethane, for example about 0.01 to about 15% by weight, and may comprise about 5 to about 85% by weight of hexabromodiphenyl ethane, for example about 55 to about 85% by weight, and as another example about 60 to about 85% by weight.

The bromodiphenyl ethane mixture (D) may comprise about 55 to about 85% by weight of hexabromodiphenyl ethane, and bromine-substituted compound(s) having an odd number of bromine substituents (also referred to as an odd numbered bromodiphenyl ethane) about 1 to about 25% by weight, based on the total weight of the bromodiphenyl ethane mixture.

The bromine-substituted compound in which the number of bromine substituents is odd may include pentabromodiphenyl ethane, heptabromodiphenyl ethane, nonabromodiphenyl ethane, or a combination thereof.

In an exemplary embodiment based on an area ratio in a GC/MS (Gas Chromatography/Mass Spectrometry) analysis, the bromodiphenyl ethane mixture may comprise about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodephenyl ethane.

In an exemplary embodiment, the bromodiphenyl ethane mixture may comprise about 5 to about 15% by weight of pentabromodiphenyl ethane, about 72 to about 85% by weight of hexabromodiphenyl ethane, about 2 to about 10% by weight of heptabromodiphenyl ethane, and about 0.1 to about 3% by weight of octabromodiphenyl ethane.

In an exemplary embodiment, the bromodiphenyl ethane mixture may comprise about 55 to about 75% by weight of hexabromodiphenyl ethane, about 11 to about 16% by weight of heptabromodiphenyl ethane, about 10 to about 20% by weight of octabromodiphenyl ethane, and about 1 to about 9% by weight of nonabromodiphenyl ethane.

In an exemplary embodiment, the bromodiphenyl ethane mixture may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl.

In an exemplary embodiment, the bromodiphenyl ethane mixture may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl, and about 0.01 to about 1% by weight of decabromodiphenyl.

In an exemplary embodiment, the bromodiphenyl ethane mixture may comprise about 55 to about 83% by weight of hexabromodiphenyl ethane, about 7 to about 17% by weight of heptabromodiphenyl ethane, about 5 to about 23% by weight of octabromodiphenyl ethane, about 1 to about 7% by weight of nonabromodiphenyl, and about 0.01 to about 1% by weight of decabromodiphenyl.

In the present invention, the bromodiphenyl ethane mixture (D) may be used in an amount of about 0.5 to about 30 parts by weight, for example about 1 to about 25 parts by weight, as another example about 5 to about 20 parts by weight, and as another example about 7 to about 15 parts by weight, based on about 100 parts by weight of a base resin comprising (A), (B) and (C). If the amount of the bromodiphenyl ethane mixture is less than about 0.5 weight parts, it can be difficult to improve flame retardancy. When the amount of the bromodiphenyl ethane mixture exceeds about 30 weight parts, there can be a problem of low flowability.

(E) Bromine-Containing Flame Retardant

The bromine-containing flame retardant of the present invention can be a compound containing bromine in an amount of about 40 to about 87% by weight.

Examples of the bromine-containing flame retardant may include without limitation tetrabromobisphenol A, decabromodiphenyl oxide, decabromodiphenyl ethane, 1,2-bis(tribromophenyl)ethane, brominated epoxy oligomer having a molecular weight of about 600 to about 8,000, octabromotrimethylphenyl indane, bis(2,3-dibromopropyl ether), tris(tribromophenyl)triazine, brominated aliphatic or aromatic hydrocarbon, and the like. These bromine-containing flame retardant may be used alone or in combination of two or more.

The thermoplastic resin composition of the invention may include the bromine-containing flame retardant selectively. If the bromine-containing flame retardant (E) is used in an amount of about 0.5 to about 30 weight parts based on about 100 weight parts by weight of a base resin comprising (A), (B) and (C), the resin composition of the present invention can have excellent impact resistance and flowability. If the amount of the bromine-containing flame retardant is less than about 0.5 weight parts, it can be difficult to improve the physical properties. When the amount of the bromine-containing flame retardant exceeds about 30 weight parts, there can be a problem of reduced impact strength.

In an exemplary embodiment, the total amount of bromodiphenyl ethane mixture (D) and the bromine-containing flame (E) may be about 10 to about 30 parts by weight, based on about 100 parts by weight of the base resin comprising (A), (B), and (C). If the total amount of bromodiphenyl ethane mixture (D) and the bromine-containing flame (E) is within this range, it can be possible to obtain a balance of excellent physical properties of impact strength and flowability.

The ratio of bromodiphenyl ethane mixture (D) to the bromine-containing flame (E) can be about 35 to about 70% by weight to about 30 to about 65% by weight.

Other additives may be included in the resin composition of the present invention. Examples of such additives include without limitation heat stabilizers, dyes and pigments, lubricants, releasing agents, dispersant, anti-dripping agents, weather stabilizers, inorganic fillers, inorganic fibers and the like, and combinations thereof. The flame retardant may comprise other halogen-based flame retardants as well as bromine-based flame retardants. Phosphorous-based flame retardants may also used. The flame retarding aid may comprise an antimony oxide such as antimony trioxide, antimony pentoxide, metal antimonite, or a combination thereof.

The resin composition according to the present invention can be prepared by a conventional process. For example, all the components and optionally additives can be mixed together and extruded through an extruder and can be prepared in the form of pellets.

The resin composition of the present invention can have excellent impact resistance compared with conventional flame retardant resins, and can be molded into various products. The resin composition of the invention can be particularly suitable for the production of electric or electronic housings, computer or office equipment housings, structural materials and the like.

The invention may be better understood by reference to the following examples which are intended for the purpose of illustration and are not to be construed as in any way limiting the scope of the present invention, which is defined in the claims appended hereto.

EXAMPLES (A) Functional Group-Containing Vinyl Copolymer Resin Reactive with Polyester To a mixture comprising 100 parts by weight of monomer mixture including 1.0 mol % of glycidyl methacrylate and 99.0 mol % of styrene copolymer compound including 72% by weight of styrene and 28% by weight of acrylonitrile and 120 parts by weight of deionized water are added 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes, maintained at this temperature for 180 minutes, and functional group-containing vinyl copolymer resin reactive with polyester (GMA-SAN) is obtained. The resultant product is washed, dehydrated and dried to obtain functional group-containing vinyl copolymer resin reactive with polyester (GMA-SAN) in the form of powder.

(B) Aromatic Vinyl Graft Copolymer Resin

Acrylonitrile-butadiene-styrene (ABS) is used, comprising of about 30% by weight of graft copolymer resin (b1) and about 70% by weight of copolymer resin (b2).

(C) Polyester Resin (C1) SKYPET-1100 (PET) produced by SK Chemical Corporation is used.
(C2) Shinite K006 (PBT) produced by SHINKONG Corporation is used.

(D) Bromodiphenyl Ethane Mixtures

Bromine is injected into diphenyl ethane mixtures so that about 5 to about 8.5 hydrogens are substituted with bromine within the diphenyl ethane. Analyses of the synthesized bromodiphenyl ethane mixtures are performed using a GC/MS after diluting given samples to a dilution factor of 2000 (0.5 mg/mL) with toluene to thereby completely dissolve the samples. After diluting given samples, a 1 mL volume of diluted sample is injected into the GC via. Agilent 7683 injector, Agilent 7890N Gas Chromatography, and Agilent 5975C Mass Spectroscopy Detector are used as measuring instruments.

Measuring conditions are as follows: an inlet temperature is 320° C., a split ratio is splitless, a column is UA-1 or DB-5HT, a column flow rate is 1.0 ml/min, an oven temperature program is 40° C. (2 min)-40° C./min→200° C.-10° C./min→260° C.-20° C./min→340° C. (2 min), and an MS interface temperature is 280° C. The qualitative analysis is conducted by injecting a 1 μl sample into a GC/MSD using an auto-sampler. The respective measured compositions are used based on the area. The Br content analysis is carried out using an IC. Br contents of the samples are measured by drawing up calibration curves using an IC-500 after injecting an excessive amount of oxygen into the sample and burning the samples using the injected oxygen. Compositions of the prepared bromodiphenyl ethane mixtures are represented in the following table.

TABLE 1

| Comp. | Area ratio (%) | | | | | | | | |
|---|---|---|---|---|---|---|---|---|---|
|  | D1 | D2 | D3 | D4 | D5 | D6 | D7 | D8 | D9 |
| An equivalent of Br | 5 | 6 | 6.4 | 6.75 | 7 | 7.35 | 7.7 | 8 | 8.5 |
| Br4 | 18.9 | — | — | — | — | — | — | — | — |
| Br5 | 64.7 | 13.6 | 1.6 | 1.4 | 0.9 | 1.9 | — | — | — |
| Br6 | 16.4 | 79.9 | 83 | 77.6 | 71.2 | 65.7 | 57.4 | 35.4 | 16 |
| Br7 | — | 6.2 | 13.5 | 13.4 | 13.8 | 12.8 | 15 | 16.1 | 17.1 |
| Br8 | — | 0.3 | 1.9 | 6.6 | 10.7 | 13.5 | 18.2 | 30.6 | 41 |
| Br9 | — | — | — | 1 | 3.4 | 4.5 | 8.8 | 16.8 | 24.3 |
| Br10 | — | — | — | — | — | 0.1 | 0.6 | 1.1 | 1.6 |

(E) Bromine-Based Flame Retardant (E1) Saytex-8010 (Decabromo diphenyl ethane) produced by Albemarle Corporation is used.
(E2) FR-245 (Tris[Tribromophenyl]Triazine) produced by ICL Corporation is used.

Examples 1-7 and Comparative Examples 1-2

PET Resin Blend

The components as shown in Table 2 are mixed with a Hansel mixer for 3 to 10 minutes to prepare a mixture. The mixtures include about 5 parts by weight of a flame retarding aid (antimony trioxide [ANTIS-W] produced by Korean Ilsung Antimon Corporation), about 0.3 parts by weight of a heat stabilizer (Irganox 1076), and about 0.5 parts by weight of an anti-dripping agent (TEFLON 7A-J produced by Dupont-Mitsui Chemical Corporation). The mixture is fed into a conventional twin screw extruder at a speed of 30 to 60 kg/hr and extruded at 180-280° C. at a screw speed of 150 to 300 rpm as pellets. The resin pellets are dried at 80° C. for 2 hours, and molded into test specimens using a 6 oz injection molding machine at 180 to 280° C. with a barrel temperature of 40 to 80° C. The flame retardancy of the test specimens are measured according to UL 94 VB at a specimen thickness of ¼", after leaving the specimens at 23° C. and 50% relative humidity for 40 hours. The Izod impact strength (¼" notch, kgf·cm/cm) is measured in accordance with ASTM 256A. The flowability (Melt Flow Index, g/10 min) is measured in accordance with ASTM D-1238. The results are shown in Tables 2.

TABLE 2

|  |  | \multicolumn{7}{c|}{Examples} | \multicolumn{2}{c}{Comparative Examples} |
| --- | --- | --- | --- | --- | --- | --- | --- | --- | --- | --- |
|  |  | 1 | 2 | 3 | 4 | 5 | 6 | 7 | 1 | 2 |
| (A) GMA-SAN |  | 20 | 20 | 20 | 20 | 20 | 20 | 20 | 20 | 20 |
| (B) ABS |  | 40 | 40 | 40 | 40 | 40 | 40 | 40 | 40 | 40 |
| (C) PET |  | 40 | 40 | 40 | 40 | 40 | 40 | 40 | 40 | 40 |
| (D) Bromo- | D2 | — | — | 10 | — | — | — | 25 | — | — |
| diphenyl | D5 | 10 | 10 | — | — | 10 | 10 | — | — | — |
| ethane mixture | D8 | — | — | — | 10 | — | — | — | — | — |
| (E) Bromine- | E1 | 5 | — | — | — | 15 | — | — | 15 | — |
| containing | E2 | — | 5 | 5 | 5 | — | 15 | — | — | 15 |
| flame retardant |  |  |  |  |  |  |  |  |  |  |
| Impact strength |  | 15 | 18 | 18 | 17 | 11 | 13 | 9 | 8 | 11 |
| Flowability |  | 25 | 30 | 30 | 31 | 14 | 31 | 23 | 13 | 20 |
| Flame retardancy |  | V-0 | V-0 | V-0 | V-0 | V-0 | V-0 | V-0 | V-0 | V-0 |

As represented in Table 2, Examples 1 to 4 which include both of the bromodiphenyl ethane mixture and bromine-containing flame retardant show remarkably improved impact strength and maintain excellent flowability as compared with Comparative Examples 1 and 2 using the bromine-containing flame retardant alone. Moreover, Examples 5 to 6 which include both the bromodiphenyl ethane mixture and bromine-containing flame retardant show remarkably improved impact strength and maintain excellent flowability as compared with Example 7 using the bromodiphenyl ethane mixture alone.

Examples 8-17 and Comparative Examples 3-4

PBT Resin Blend

The preparation process is carried out in the same method as Preparation Example 1 except using the components shown in Table 3. The results are set forth in Table 3 below

TABLE 3

|  |  | \multicolumn{10}{c|}{Example} | \multicolumn{2}{c}{Comparative Example} |
| --- | --- | --- | --- | --- | --- | --- | --- | --- | --- | --- | --- | --- | --- |
|  |  | 8 | 9 | 10 | 11 | 12 | 13 | 14 | 15 | 16 | 17 | 3 | 4 |
| (A) GMA-SAN |  | 10 | 10 | 10 | 10 | 20 | 20 | 10 | 10 | 10 | 10 | 10 | 10 |
| (B) ABS |  | 20 | 20 | 20 | 20 | 50 | 50 | 20 | 20 | 20 | 20 | 20 | 20 |
| (C) PBT |  | 70 | 70 | 70 | 70 | 30 | 30 | 70 | 70 | 70 | 70 | 70 | 70 |
| (D) Bromo- | D2 | — | — | 10 | — | — | — | — | — | — | — | — | — |
| diphenyl ethane | D5 | 10 | 10 | — | — | 10 | 10 | 10 | 10 | 15 | 25 | — | — |
| mixture | D8 | — | — | — | 10 | — | — | — | — | — | — | — | — |
| (E) Bromine- | E1 | 5 | — | — | — | 5 | — | 15 | — | — | — | 15 | — |
| containing | E2 | — | 5 | 5 | 5 | — | 5 | — | 15 | — | — | — | 15 |
| flame retardant |  |  |  |  |  |  |  |  |  |  |  |  |  |
| Impact strength |  | 14 | 19 | 18 | 19 | 16 | 22 | 12 | 17 | 10 | 8 | 7 | 9 |
| Flowability |  | 25 | 30 | 31 | 30 | 24 | 28 | 22 | 32 | 18 | 22 | 15 | 17 |
| Flame retardancy |  | V-0 | V-0 | V-0 | V-0 | V-0 | V-0 | V-0 | V-0 | V-0 | V-0 | V-0 | V-0 |

As represented in Table 3, Example 16 which includes the bromodiphenyl ethane mixture show remarkably improved impact strength and maintains excellent flowability as compared with Comparative Examples 3 and 4 using the same amount of bromine-containing flame retardant. Moreover, Examples 8 to 15 which include both the bromodiphenyl ethane mixture and bromine-containing flame retardant show remarkably improved impact strength and maintain excellent flowability as compared with Examples 16 using the bromodiphenyl ethane mixture alone.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
   (A) about 1 to about 98% by weight of a functional group-containing vinyl copolymer resin reactive with polyester;
   (B) about 1 to about 98% by weight of an aromatic vinyl graft copolymer resin;
   (C) about 1 to about 98% by weight of a polyester resin; and
   (D) about 0.5 to about 30 parts by weight of a bromodiphenyl ethane mixture, based on about 100 parts by weight of a base resin comprising (A), (B) and (C), wherein said bromodiphenyl ethane mixture (D) comprises about 55 to about 85% by weight of hexabromodiphenyl ethane and about 1 to about 25% by weight of a bromodiphenyl ethane compound having an odd number of bromine substituents, based on the total weight of the bromodiphenyl ethane mixture.

2. The thermoplastic resin composition of claim 1, further comprising about 0.5 to about 30 parts by weight of a bromine-containing flame retardant (E), based on about 100 parts by weight of a base resin comprising (A), (B) and (C).

3. The thermoplastic resin composition of claim 1, wherein the functional group-containing vinyl copolymer resin reactive with polyester (A) is prepared by polymerizing about 0.01 to about 5 mol % of an unsaturated compound containing a functional group reactive with polyester (a1), and about 95 to about 99.99 mol % of a vinyl compound (a2).

4. The thermoplastic resin composition of claim 1, wherein said aromatic vinyl graft copolymer resin (B) comprises about 10 to about 100% by weight of a graft copolymer resin (b1) and about 0 to about 90% by weight of a copolymer resin (b2).

5. The thermoplastic resin composition of claim 1, wherein said polyester resin (C) comprises polyethylene terephthalate, polybutylene terephthalate, or a combination thereof.

6. The thermoplastic resin composition of claim 1, wherein said bromodiphenyl ethane mixture (D) comprises about 5 to about 85% by weight of hexabromodiphenyl ethane and about 0.01 to about 30% by weight of heptabromodiphenyl ethane, based on the total weight of the bromodiphenyl ethane mixture.

7. The thermoplastic resin composition of claim 1, further comprising a bromine-containing flame retardant (E) containing bromine in an amount of about 40 to about 87% by weight.

8. The thermoplastic resin composition of claim 1, further comprising one or more additives comprising a heat stabilizer, dye, pigment, lubricant, releasing agent, dispersant, anti-dripping agent, weather stabilizer, inorganic filler, inorganic fiber or a combination thereof.

9. The thermoplastic resin composition of claim 3, wherein said functional group-containing unsaturated compound reactive with polyester (a1) is represented by the following chemical formula 1:

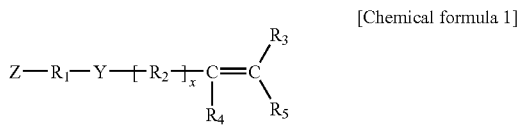

[Chemical formula 1]

wherein:
$R_3$, $R_4$, and $R_5$ are each independently hydrogen, saturated or unsaturated $C_1$-$C_{12}$ alkyl, $C_6$-$C_{14}$ aryl, or saturated or unsaturated $C_1$-$C_{12}$ alkyl-substituted $C_6$-$C_{14}$ aryl;

Y is an ether group (—O—), carboxyl group (—O—[C=O]—, —[O=C]—O—), $C_1$-$C_{12}$ alkylene, $C_6$-$C_{14}$ arylene, or saturated or unsaturated $C_1$-$C_{12}$ alkyl-substituted $C_6$-$C_{14}$ arylene;

with the proviso that when Y is an ether group (—O—) or carboxyl group (—O—[C=O]—, —[O=C]—O—), $R_1$ and $R_2$ are each independently $C_1$-$C_{12}$ alkylene, $C_6$-$C_{14}$ arylene or saturated or unsaturated $C_1$-$C_{12}$ alkyl-substituted $C_6$-$C_{14}$ arylene; and when Y is $C_1$-$C_{12}$ alkylene, $C_6$-$C_{14}$ arylene or saturated or unsaturated $C_1$-$C_{12}$ alkyl-substituted $C_6$-$C_{14}$ arylene, Y represents a (R1-Y—R2) structure;

x=0 or 1; and

Z is an epoxy group, carboxyl group, isocyanate group, oxadiazole group, amine group, or hydroxyl group.

10. The thermoplastic resin composition of claim 3, wherein said functional group-containing unsaturated compound reactive with polyester (a1) comprises epoxy alkyl acrylate, allyl glycidyl ester, aryl glycidyl ester, glycidyl methacrylate, glycidyl acrylate, butadiene monoxide, vinyl glycidyl ether, glycidyl itaconate or a combination thereof.

11. The thermoplastic resin composition of claim 3, wherein said vinyl compound (a2) comprises about 50 to about 99% by weight of an aromatic vinyl monomer and about 1 to about 50% by weight of an unsaturated nitrile monomer.

12. The thermoplastic resin composition of claim 4, wherein said graft copolymer resin (b1) is prepared by graft-polymerizing about 5 to about 65% by weight of a rubbery polymer, about 34 to about 94% by weight of an aromatic vinyl monomer, and about 1 to about 30% by weight of an unsaturated nitrile monomer.

13. The thermoplastic resin composition of claim 4, wherein said graft copolymer resin (b2) is prepared by graft-polymerizing about 70 to about 95% by weight of an aromatic vinyl monomer and about 5 to about 30% by weight of an unsaturated nitrile monomer.

14. The thermoplastic resin composition of claim 7, wherein said bromine-containing flame retardant (E) comprises tetrabromobisphenol A, decabromodiphenyloxide, decabromodiphenyl ethane, 1,2-bis(tribromophenyl)ethane, brominated epoxy oligomer having a molecular weight of about 600 to about 8,000, octabromotrimethylphenyl indane, bis(2,3-dibromopropyl ether), tris(tribromophenyl)triazine, brominated aliphatic or aromatic hydrocarbon, or a combination thereof.

* * * * *